(No Model.)
E. NORTON & J. G. HODGSON.
CAN ENDING MACHINE.
No. 307,491. Patented Nov. 4, 1884.
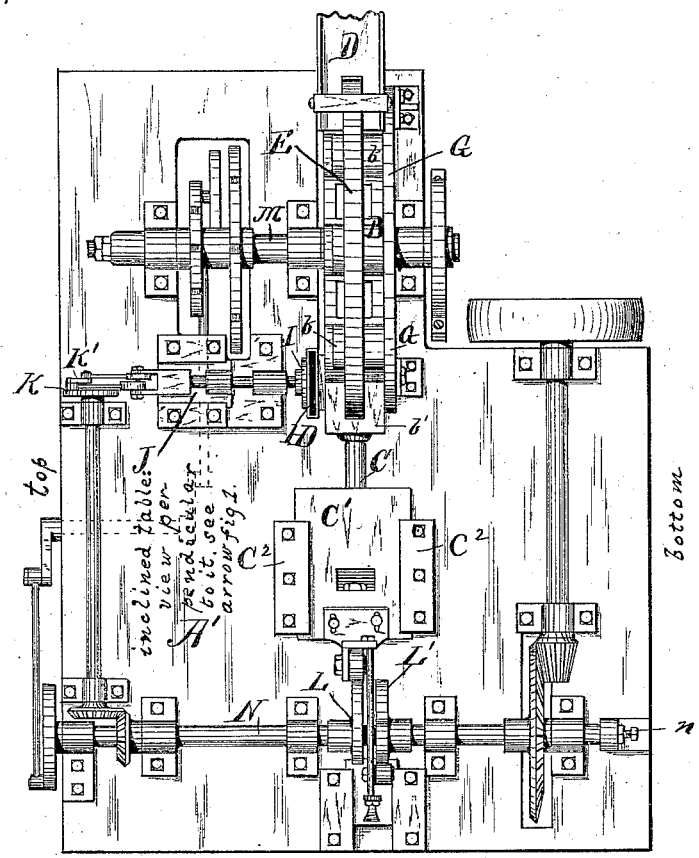
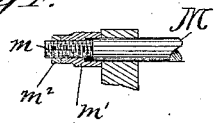
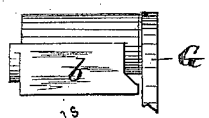
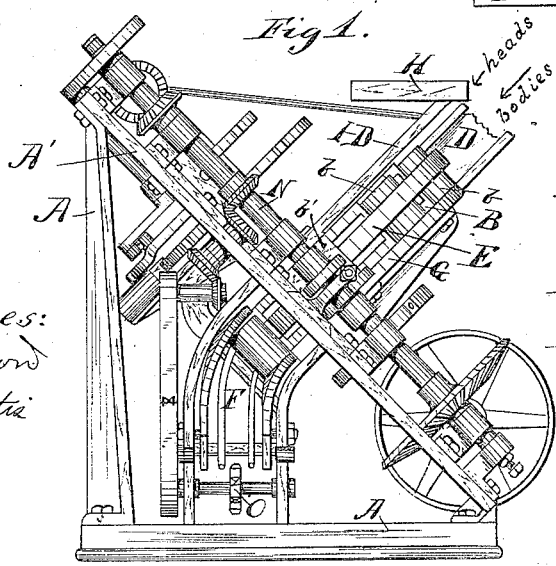
Witnesses:
Taylor E. Brown
Lew. E. Curtis
Inventors:
Edwin Norton
John G. Hodgson
By
Munday, Evarts
and Adcock
their Attorneys United States Patent Office.

EDWIN NORTON AND JOHN G. HODGSON, OF CHICAGO, ILLINOIS, ASSIGNORS TO SAID EDWIN NORTON AND OLIVER W. NORTON, OF SAME PLACE.

CAN-ENDING MACHINE.

SPECIFICATION forming part of Letters Patent No. 307,491, dated November 4, 1884.

Application filed July 19, 1884. (No model.)

*To all whom it may concern:*

Be it known that we, EDWIN NORTON and JOHN G. HODGSON, citizens of the United States, residing in Chicago, in the county of Cook and State of Illinois, have invented a new and useful Improvement in Can-Ending Machines, of which the following is a specification.

This invention relates to machines for ap10 plying the covers or final heads to cans filled with solid or semi-solid substances, like fish, meat, &c.

It is the object of the present invention to produce an automatic machine for applying ends or covers to filled cans; and it consists in an inclined clamp or mold for holding the can, in connection with a piston or device for applying the end or head thereto while held in such inclined position. A stationary plate or rest is provided at the opposite end of the clamp or mold, for the bottom of the can to rest against or upon. Inclined chutes deliver the filled cans to the mold, and the heads or covers at the mouth of the mold in front of the reciprocating piston, which forces the same upon the can. The clamp or mold should preferably be inclined at an angle of about forty-five degrees. By employing an inclined mold to clasp the filled cans, the same may be readily delivered thereto automatically by simply employing a similarly-inclined chute, the inclined position of the chute and mold serving both to retain the contents of the can therein, while it also permits the cans to roll or feed by gravity into the mold; and for the same reason we are also thus enabled to deliver the heads or covers in front of the reciprocating piston and before the mouth of the mold by means of an inclined chute. The mold is of course made in two parts, which open to receive and discharge the can. The movable part of the mold is mounted on a reciprocating piston, while the other part of the mold we mount on an intermittently-revolv45 ing wheel, which operates to bring the series of half-molds mounted thereon in turn before the reciprocating half-mold.

In the accompanying drawings, which form a part of this specification, and in which simi50 lar letters of reference indicate like parts, Figure 1 is a side elevation of a device embodying our invention. Fig. 2 is a plan view, looking in the direction indicated by the arrows in Fig. 1. Fig. 3 is a detail side elevation of one of the half-molds on the intermittently-revolving wheel, and Fig. 4 is a detail sectional view of a part hereinafter to be described.

In said drawings, A represents the frame of the machine; A', its inclined bed-plate; B, an inclined intermittently-revolving wheel, upon the periphery of which the inclined halfmolds *b* are mounted.

C is a reciprocating piston, upon the end of which the reciprocating half-mold *b'* is mounted, and C' is the reciprocating head sliding in suitable guides, C², on the inclined bed-plate, to which reciprocating head the piston C is secured.

D is a chute inclined like the wheel B, for delivering the filled cans to the half-molds *b* on said wheel as it intermittently revolves.

E is a curved guard, extending from the supply-chute D to the discharge-chute F, for the purpose of retaining the filled cans in the part molds or clamps *b* while the wheel revolves.

G is a stationary plate or shield at the lower end of the half-molds *b*, for the bottom of the cans to rest against, which serves to support and retain them in position in the half-molds.

H is an inclined feed-chute for the can-heads, by means of which the heads or covers are delivered at the mouth of the mold in front of the reciprocating piston I, which serves to force said heads upon the filled can when the same is clamped between the two-part molds *b b'*.

H is a tray at the top of this chute for holding the can-heads. The piston I is secured to the reciprocating cross-head J, by which it is operated.

K K' are the cams for operating the crosshead J, and L L' are the cams for operating the cross-head C'.

The shaft M, on which the wheel B is mounted, occupies an inclined position, and in order to take up the wear on the ends of the boxes and keep said shaft and the wheel and other parts mounted thereon in proper adjustment, we provide the end of this shaft with an adjusting-screw, *m*, nut *m'*, and jamnut *m²*, by means of which the wear may be taken up from time to time.

The inclined shaft N, on which the cams L L' and other parts are mounted, is provided with a set-screw, n, at its lower end, by means of which the wear on the ends of the boxes may be taken up, and the various moving parts or gears on said shaft be kept in proper adjustment.

Space should be left between the ends of the half-molds b on the wheels B, and the plate or shield G, against which the bottom of the can rests, so that any dirt or obstructions that may adhere to the can may fall through such space or opening, and thus not obstruct the closing of the molds upon the can, or the operation of the head-applying piston.

The discharge-chute F delivers the cans to the elevator or carrier O, by which they are conducted to the soldering-machine for soldering the end or cover upon the can.

The carrier O may be of any usual construction. That indicated in the drawings consists of sprocket-wheels and chain, the chain being furnished with the usual projecting fingers or arms to bear against the can, and thus carry or shove it up the inclined track or chute.

As the construction of such carriers is well known, we have not deemed it necessary to show the same in detail in the drawings. It will of course be understood that if the soldering-machine should be located on a lower level than the discharge-chute F, a simple chute may be employed, and that no carrier would then be necessary to elevate the cans.

The particular construction of the intermittently-revolving half-mold wheel B, the reciprocating half-mold, the chutes for delivering the can-heads and the cans to the machine, and the can-head-applying piston, as well as the particular mechanism or devices for actuating these parts, constitute no part of the present invention, and as the construction and operation of the same are fully shown and described in a patent heretofore granted to us under date of March 20, 1883, and numbered 274,363, to which we would here refer, we do not deem it necessary to herein show and describe the same in detail.

Other devices than that herein shown for holding the can may be employed, provided the same hold it in an inclined position, so as to receive the can automatically from the inclined delivery-chute, and at the same time prevent the contents of the can from spilling, and other devices may be substituted for that shown to apply or secure the heads or covers to the can.

The discharge-chute F receives the can from the mold in an inclined position, and the chute, being spirally twisted or curved, delivers the can to the carrier O in a horizontal position.

We claim—

1. The combination of an inclined clamp or mold for holding the can with a reciprocating piston or device for applying the head or cover thereto while held in such inclined position, substantially as specified.

2. The combination of an inclined clamp or mold for holding the can with a plate or support for the bottom of the can to rest against, and a reciprocating piston or device for forcing the head upon the can, substantially as specified.

3. The combination of an inclined clamp or mold with a plate or support at the lower end of said mold, an inclined chute for delivering the can-heads at the mouths of said mold, and a reciprocating piston for applying said heads to the can, substantially as specified.

4. The combination of an inclined wheel, B, having inclined half-molds b upon its periphery, with a reciprocating inclined half-mold, b', a plate or shield, G, at the lower end of said half-molds to support the cans, an inclined chute to deliver the filled cans to the half-molds, an inclined chute for delivering the can-heads, and a reciprocating piston for applying the same to the can, substantially as specified.

5. The combination, with an inclined intermittently-revolving wheel having inclined half-molds upon its periphery, of an inclined reciprocating half-mold and a piston for applying the can-heads to the can, substantially as specified.

6. The combination, with an intermittently-revolving wheel having inclined half-molds upon its periphery, of an inclined reciprocating half-mold and a piston for applying the can-heads to the can, and a shield or plate at the lower end of said half-molds for the cans to rest against, substantially as specified.

7. The combination, with an inclined intermittently-revolving wheel having inclined half-molds upon its periphery, of an inclined reciprocating half-mold and a piston for applying the can-heads to the can, a shield or plate at the lower end of said half-molds for the cans to rest against, an inclined chute for the can-heads, an inclined chute to deliver the cans to the half-mold wheel, and an inclined discharge-chute, substantially as specified.

8. The combination of an inclined device for holding the can with an inclined chute for delivering the cans thereto in an inclined position, and a device for applying the cover or head to the can while held in such inclined position, substantially as specified.

9. The combination of an inclined device for holding the can with an inclined chute for delivering the cans thereto in an inclined position, and a device for applying the cover or head to the can while held in such inclined position, and a spirally twisted or curved discharge-chute to receive the can in an inclined position and deliver it in a horizontal position to the carrier, substantially as specified.

EDWIN NORTON.
JOHN G. HODGSON.

Witnesses:
H. M. MUNDAY,
EDMUND ADCOCK.